Patented June 3, 1924.

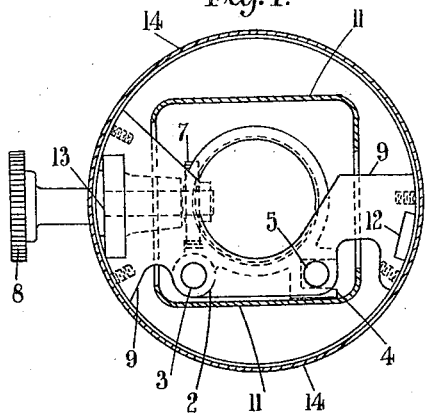
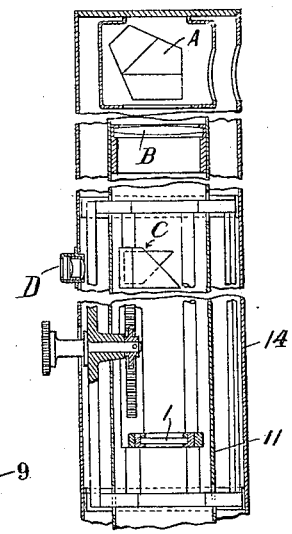
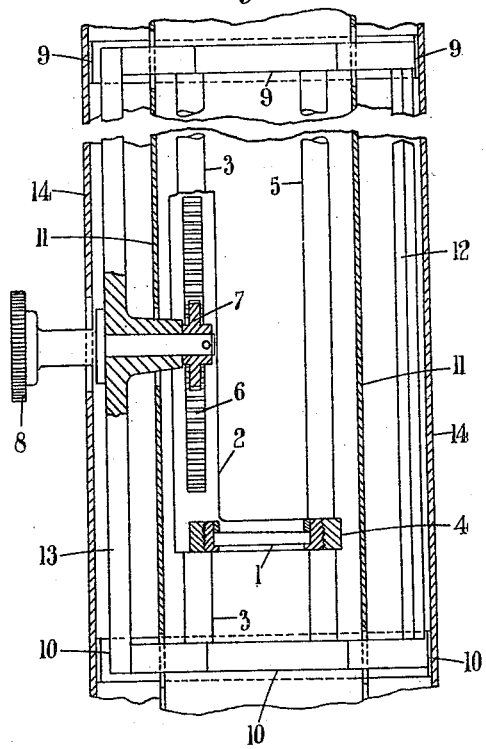

1,496,253

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF GLASGOW, SCOTLAND.

RANGE FINDER AND HEIGHT FINDER.

Application filed August 16, 1921. Serial No. 492,867.

(GRANTED UNDER THE PROVISIONS OF THE ACT OF MARCH 3, 1921, 41 STAT. L., 1313.)

*To all whom it may concern:*

Be it known that we, ARCHIBALD BARR and WILLIAM STROUD, subjects of the King of Great Britain and Ireland, and both of Caxton Street, Anniesland, Glasgow, Scotland, have invented new and useful Improvements in Range Finders and Height Finders (which has been patented in Great Britain, No. 129,881, dated October 12, 1918), of which the following is a specification.

Our invention relates to rangefinders and heightfinders and like instruments working on the principle of triangulation from a short self-contained base, and in which the operation of taking an observation involves the translation of a deflecting prism along the beam of light from an objective to the eyepiece prism combination. For simplicity we may refer in what follows to such instruments as "rangefinders."

The object of our invention is to provide improved means for carrying and operating those parts of the mechanism of a rangefinder, heightfinder, or the like, which are moved in the process of taking a range or height or other like observation so that forces applied to those parts will not produce bending or twisting of the frame carrying the fixed optical parts.

In rangefinders of the kind referred to, it has been customary to support the internal parts of the operating mechanism on the frame carrying the objectives and eyepiece prisms and to carry the working head or other external working part to which forces are applied in the operation of the instrument from an outer tube or case and to provide a flexible connection between these external and internal parts so as to minimize the effect of the forces applied from without in producing distortion of the inner frame.

According to the present invention the internal operating parts of the rangefinder are carried on a frame independent of the frame carrying the fixed optical parts. This frame carrying the operating parts (which we may call the mechanism frame) is supported from the outer tube and when necessary members of it project through clearing apertures in the frame carrying the fixed optical parts (which we may refer to as the optical frame).

The mechanism frame may comprise guides for the deflecting prism and supports for the screw, rack or other gear for moving the deflecting prism. These parts will usually be inside the optical frame and members of the mechanism frame may project through apertures in the optical frame, (so arranged that the two frames do not touch each other), and be secured to the outer tube of the instrument. The working head or other external part to which forces are directly applied may then be connected mechanically to the internal operating parts without the intervention of a flexible coupling.

A like construction may be provided for the support and operation of elements provided for the adjustment of the rangefinder.

The invention is specifically valuable in the case of rangefinders or heightfinders which are to work upon objects at different angular elevations. In such cases if the internal operating mechanism is attached to the optical frame the movable parts will have an effect in bending the optical frame in the plane of triangulation to an extent varying with the position of the moving parts—such as the deflecting prism and its mounting—in the optical frame and with the inclination of the plane of observation to the horizontal. By supporting the moving parts on a mechanism frame independent of the optical frame, the chief cause of such variation is eliminated. The optical frame can then be so supported and balanced that no sensible error is produced by the varying direction of gravity relatively to the plane of triangulation and the adjustment of this balance will not be altered by movements of the operating internal parts.

The accompanying drawings show one way in which the desired result may be attained.

Figure 1 is a transverse section and Figure 2 a portion of a longitudinal section of an instrument embodying the present invention.

Fig. 3 is a longitudinal section illustrating a portion of the same instrument showing fixed optical parts.

The instrument to which the drawings refer is a rangefinder, comprising, as indicated at Figure 3, end reflectors A, one at each end of the instrument, one end only of the instrument is shown in the illustration, two objectives B, an eyepiece prisms system C and eyepiece D. The objectives B are situated each between an end reflector A and the prisms system C, one between each. The operating portion of the instrument consists of a deviating prism 1 which is traversed by the beam of light from an objective situated at one end of the optical frame, in Figure 2 the lower end, to the eyepiece prism system C, see Figure 3, in a well known manner.

14 is the outer tube of the instrument and 11 is the inner tube or optical frame of the instrument. The optical frame is supposed to be carried (as is customary) from the outer tube by bearings so constructed and arranged that forces applied to the outer tube in the operation of the instrument do not sensibly bend or distort the optical frame.

1 is the deflecting prism guided, in the case shown, by a tubular extension 2 sliding on a rod 3, and prevented from rotating about the rod 3 by being forked at 4 on to a second guide rod 5.

In the case shown the deflecting prism 1 is operated by means of a rack 6 driven by a toothed wheel 7 the spindle of which may be rotated by a working head 8, or 8 may represent a wheel receiving its motion from other gear, the nature of which is not material to the present invention. If the part 8 is not enclosed in any casing, the opening in the outer tube 14 through which its shaft or shafts and bearing passes may be closed in any suitable manner.

In other cases the deflecting prism 1 may be operated by means of a screw or in any other suitable manner.

The guiderods 3 and 5 are supported from two brackets or cross pieces 9, 10, which are supported within and may be attached to the outer tube 14. The brackets 9 and 10 are also connected together by bars 12 and 13, one of which, 13, carries the bearing for the shaft which conveys motion from the outside to the inner working parts. The parts 9, 10, 3, 5, 12 and 13, constitute what has been referred to as the mechanism frame. As will be seen from the drawings, the brackets 9 and 10 pass through apertures in the optical frame 11 so that they and the parts they carry do not touch the optical frame. Forces applied to operate the deflecting prism gear therefore do not affect the optical frame nor does the weight of the mechanism frame or of deflecting prism and parts that move with it affect the optical frame however the instrument may be placed. In like manner the scale—if an internal one is used—and the adjusting gear may be carried on the same or on an additional mechanism frame. By these means the communication of motion to the operating mechanism of the range finder from parts outside, without affecting the optical frame, is facilitated, and moreover, gravitational forces acting on the operating mechanism which change in character with the motion of the deflecting prism and with changes in the altitude of the rangefinder, produce no effect on the optical frame.

We do not confine ourselves to the particular arrangement of parts shown. These may be varied in a great variety of ways retaining the essential feature that the deflecting prism or prisms and associated parts, and in some cases the adjusting gears, are carried on a mechanism frame or frames which have no contact with the optical frame carrying the objectives and eyepiece prisms.

We claim:—

1. A self contained base single observer rangefinder, heightfinder, or like instrument, comprising, an outer case, a frame located within the outer case on which objectives and eyepiece prism system are mounted, a structure fixed to the outer case and clear of the frame on which structure is mounted an optical part located within the frame and which is required to be moved in the operation of determining a range or height, said frame having apertures and said structure having members which extend through said apertures, for the purposes set forth.

2. A self contained base single observer rangefinder, heightfinder, or like instrument, comprising an outer case, a frame located within the outer case on which objectives and eyepiece prism system are mounted, a structure fixed to the outer case and clear of the frame, a longitudinal guide carried by said structure, optical parts located within the frame and which are required to be moved in the operation of determining a range or height mounted to slide upon said guide, said frame having apertures and said structure having members which extend through said apertures, for the purposes set forth.

ARCHIBALD BARR.
WILLIAM STROUD.